US006962076B2

(12) United States Patent
Page et al.

(10) Patent No.: US 6,962,076 B2
(45) Date of Patent: Nov. 8, 2005

(54) POSITIONING SYSTEM FOR WIND TUNNEL AND METHOD OF USE

(75) Inventors: Mark Page, Cypress, CA (US); Neil Roberts, San Marcos, CA (US); Tom Huschilt, San Clemente, CA (US); Brian Kane, Dana Point, CA (US); John Winkler, San Clemente, CA (US)

(73) Assignee: Swift Engineering, Inc., San Clemente, CA (US)

( * ) Notice: Subject to any disclaimer, the term of this patent is extended or adjusted under 35 U.S.C. 154(b) by 121 days.

(21) Appl. No.: 10/713,559

(22) Filed: Nov. 13, 2003

(65) Prior Publication Data

US 2004/0253107 A1 Dec. 16, 2004

Related U.S. Application Data

(60) Provisional application No. 60/426,118, filed on Nov. 13, 2002.

(51) Int. Cl.$^7$ ................................................ G01M 9/00
(52) U.S. Cl. ........................................................ 73/147
(58) Field of Search .......................................... 73/147

(56) References Cited

U.S. PATENT DOCUMENTS 2,448,528 A * 9/1948 Heuver ......................... 73/147
4,522,074 A * 6/1985 Hafner ................... 73/862.041
4,658,635 A   4/1987 Pszolla et al.
4,938,058 A * 7/1990 Girard ........................... 73/147
5,020,364 A * 6/1991 Manitt et al. ................ 73/147

FOREIGN PATENT DOCUMENTS

FR    2.159.548      11/1971
GB    767996         8/1954
JP    2000-131186    10/1998

* cited by examiner

Primary Examiner—William Oen
Assistant Examiner—Andre Allen
(74) Attorney, Agent, or Firm—Sheppard, Mullin, Richter & Hampton LLP

(57) ABSTRACT

A positioning system is provided for use in a wind tunnel that results in accurate and dynamic orientation for a model while reducing aerodynamic interference. The system includes a pitch-yaw sleeve having a generally cylindrical shape and a torque tube disposed askew within the sleeve and rotatable about its longitudinal axis to drive a shaft. The shaft is generally elongated and crooked. The sting, to which a model is affixed, is rotatably attached to a distal end of the shaft. Rotation of the pitch-yaw tube and/or the pitch-yaw sleeve provides precise pitch and yaw orientation of the model, and rotation of the sting relative to the shaft provides precise roll orientation.

22 Claims, 5 Drawing Sheets

POSITIONING SYSTEM FOR WIND TUNNEL AND METHOD OF USE

This application claims the benefit of U.S. Provisional Application No. 60/426,118, filed Nov. 13, 2002.

FIELD OF THE INVENTION

The present invention relates generally to wind tunnels and, more particularly, to systems for orienting models in a wind tunnel.

BACKGROUND OF THE INVENTION

Aerodynamic effects on high-speed objects such as automobiles, airplanes and missiles, have long been recognized as a critical design parameter. Models of such objects have long been tested in wind tunnels to analyze aerodynamic effects. The orientation of the object relative to the wind is an important aspect of such analysis.

For aerospace testing, the orientation of the model is commonly defined by pitch, roll and yaw and, for automotive testing; it is defined by pitch, yaw, roll, sway and heave. With some positioning systems, the model is oriented prior to testing and maintains that orientation throughout the test. Others positioning systems do allow for dynamic reorientation of the model during a test run. For example, automotive wind tunnels typically use overhead struts attached to the automobile model for heave and use a knuckle to provide and measure pitch during test runs. However, current positioning systems can unduly interfere with airflow in the test chamber, sometimes referred as aerodynamic interference. Such aerodynamic interference can adversely affect test results. Also, the fidelity of test results is affected by the precision to which the model can be oriented.

It should, therefore, be appreciated that there is a need for a positioning system to provide accurate and dynamic orientation of a model during wind tunnel testing while reducing aerodynamic interference. The present invention fulfills this need as well as others.

SUMMARY OF THE INVENTION

The present invention provides a positioning system for use in a wind tunnel that provides accurate and dynamic orientation for a model while reducing aerodynamic interference, thereby improving the fidelity of test results. The system provides dynamic pitch and yaw motion with a concentric drive configuration and, preferably, the model is aft-mounted to the system, leaving the positioning system downwind of the model. The system provides improved precision to orientation of the model. Moreover, the positioning system can be easily secured to existing wind tunnel structures and is usable in a variety of applications, such as aerospace and automotive testing.

Particularly, and by way of example only, one embodiment of a positioning system in accordance with the present invention includes sway rails, a carriage mounted to the rails for lateral movement, a heave strut mounted to the carriage for vertical movement, and an aft-sting assembly attached to the heave strut. The aft-sting assembly is configured to provide roll, pitch and yaw to a model affixed to a sting at a distal end of the assembly. Thus, the system provides dynamic movement of the model during testing in five degrees of freedom to include pitch, roll, yaw, vertical displacement, and horizontal displacement.

In a detailed aspect of a preferred embodiment of the invention, the aft-sting assembly includes a pitch-yaw sleeve having a generally cylindrical shape and a shaft torque tube disposed askew within the sleeve and rotatable about its longitudinal axis. The pitch-yaw sleeve is maintained generally parallel to airflow and is rotatable about its longitudinal axis. A pitch-yaw shaft is attached to an end of the pitch-yaw tube. The shaft is generally elongated and crooked, i.e., dog-leg, such that rotation of the torque tube causes the shaft to trace a conic pattern. The sting, to which a model is affixed, is rotatably attached to a distal end of the pitch-yaw shaft. Rotation of the pitch-yaw tube and/or the pitch-yaw sleeve provides precise pitch and yaw orientation of the model, and rotation of the sting relative to the shaft provides precise roll orientation.

In another detailed aspect of a preferred embodiment of the invention, the pitch-yaw sleeve is driven by a sleeve motor and harmonic drive, and the pitch-yaw shaft is driven by a shaft motor and harmonic drive. Preferably, the harmonic drives have a relatively high gear reduction to help facilitate precise positioning of the model.

In a preferred embodiment of the invention, the positioning system includes a computer that sends commands for actuating the various motors of the positioning system. A user can input a testing profile to include movement of the model throughout a range of orientations. The computer is programmed to receive user inputs and direct the system to perform the prescribed test profile.

In yet another detailed aspect of a preferred embodiment of the invention, the positioning system is used with a wind tunnel further having a second positioning system, such as an overhead strut, securing a second object. In a preferred method, the first and second objects are dynamically positioned and relative to one another for improved simulations, wake survey tests, and the like. In a detailed aspect of a preferred method, the first object is a sensor, and the sensor is dynamically positioned about the second object to measure airflow.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

Embodiments of the present invention will now be described, by way of example only, with reference to the following drawings in which.

DESCRIPTION OF THE PREFERRED EMBODIMENTS

Figure 1:
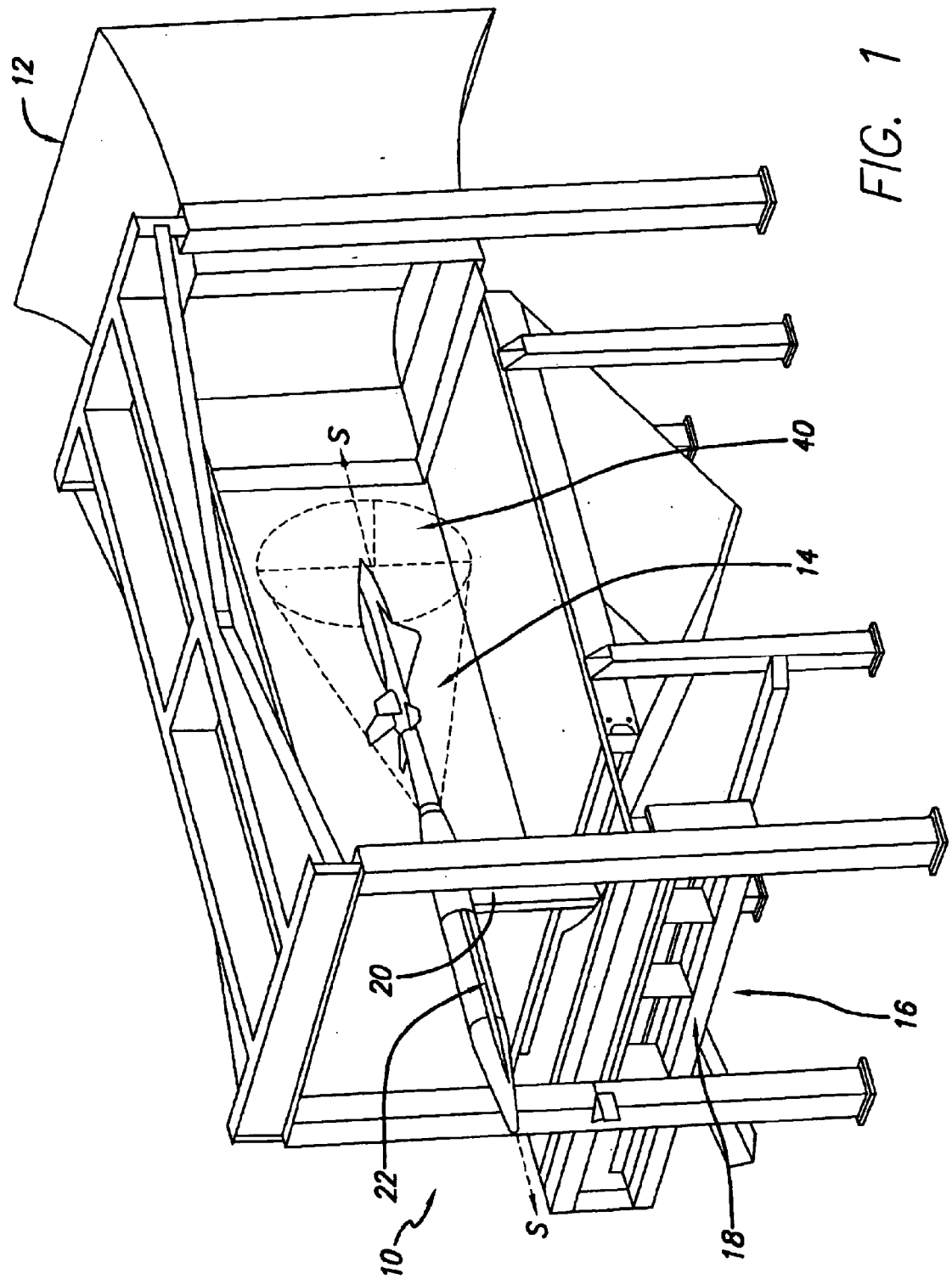
FIG. 1 is a perspective view of a model positioning system in accordance with the invention, depicting the system attached to a wind tunnel and the model in a first orientation within a range-of-motion envelope.
Figure 2:
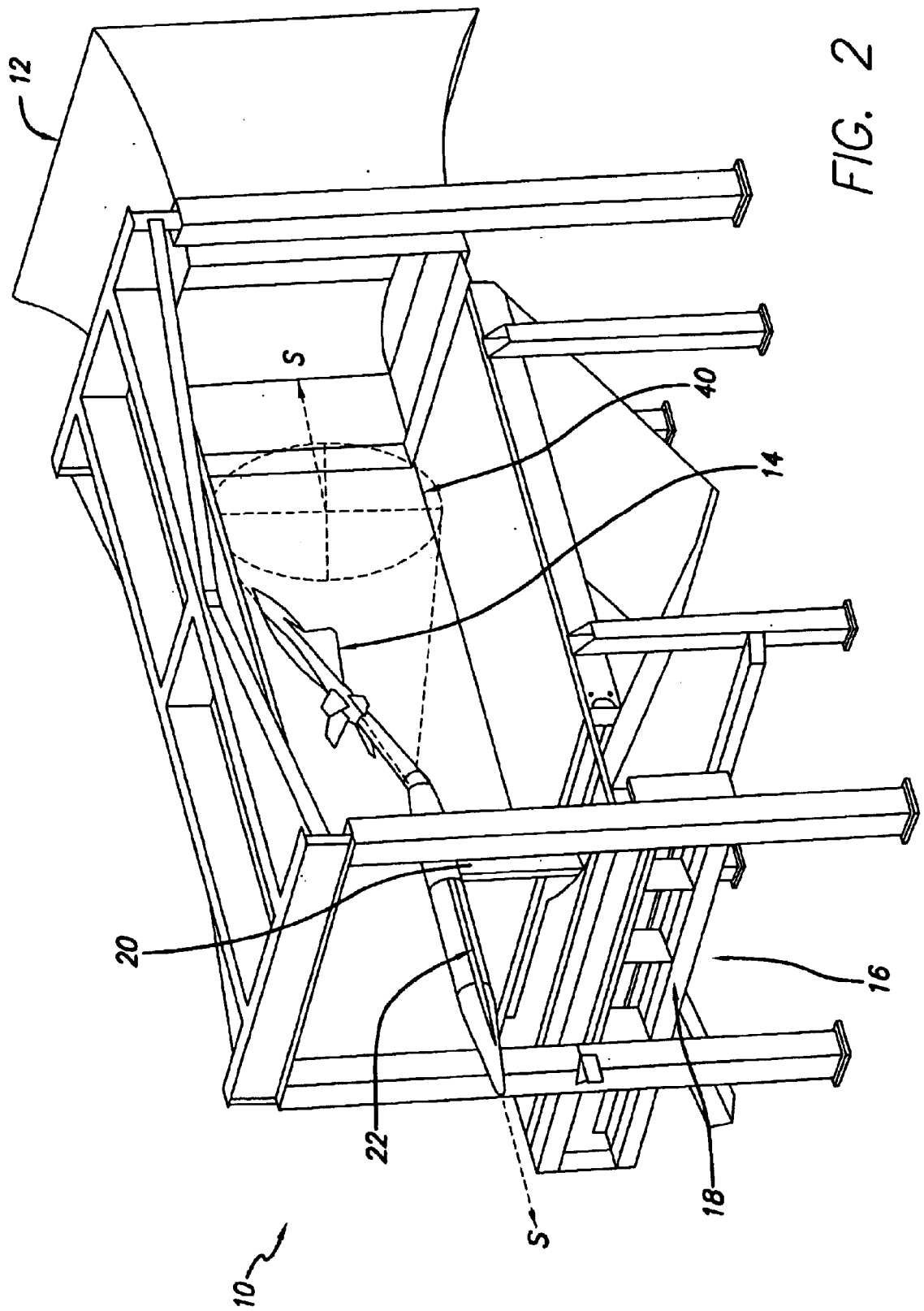
FIG. 2 is a perspective view of the positioning system of FIG. 1, depicting the model in a second orientation having a relatively high degree of pitch within a range-of-motion envelope.
Figure 3:
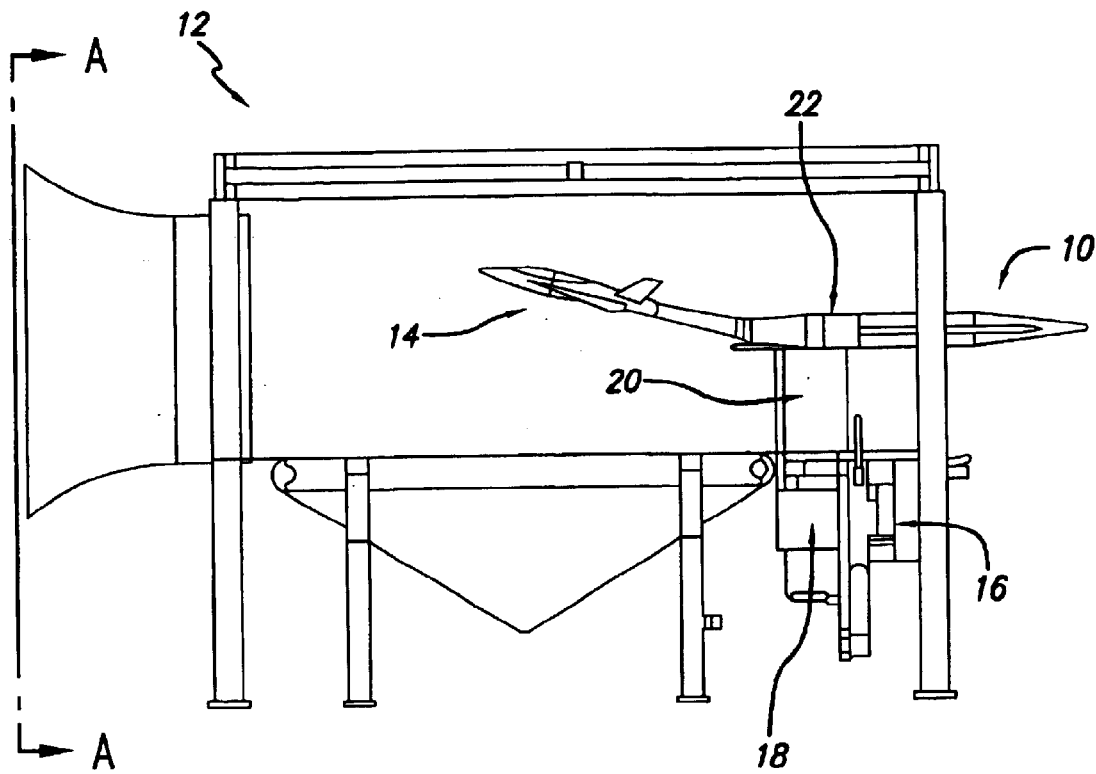
FIG. 3 is a side elevational view of the positioning system of FIG. 1, depicting the model in the second orientation.

With reference to the illustrative drawings, and particularly to FIG. 1, there is shown a positioning system 10 mounted to a wind tunnel 12 such that a model 14 is positioned within a test region of the tunnel. The positioning system dynamically provides five degrees of freedom for the model during a test run while reducing aerodynamic interference, i.e., blockage. The system provides dynamic pitch and yaw motion with a concentric drive configuration and, preferably, the model is aft-mounted to the system, leaving the positioning system downwind of the model. Moreover, the positioning system can be easily secured to existing wind tunnel structures and is usable in a variety of applications, such as aerospace and automotive testing and vehicles or structural elements of any type. Furthermore, it can be used with other positioning systems, such as overhead strut systems, thereby facilitating multiple object testing.

The positioning system 10 includes sway rails 16 attached to the wind tunnel 12 and a carriage 18 slidably attached to sway rails. The sway rails provide horizontal displacement of the model. The system can be secured to a wind tunnel relatively easily and can be retrofitted to pre-existing wind tunnel with little or no modification to either the position system or the wind tunnel. The system further includes a heave strut 20 that is slidably mounted to the carriage to provide vertical displacement of the model. The heave strut is configured to have an aerodynamic shape and is always oriented streamwise throughout the operable range of motion of the model 14, thereby aiding in minimal aerodynamic interference of the system. Motors (not shown) facilitate movement of the carriage along the sway rails and movement of the strut relative to the carriage. Also, movement of the carriage and the strut can be used to maintain the model in the center of the test region of the wind tunnel as the roll, pitch and yaw are varied.

Figure 4:
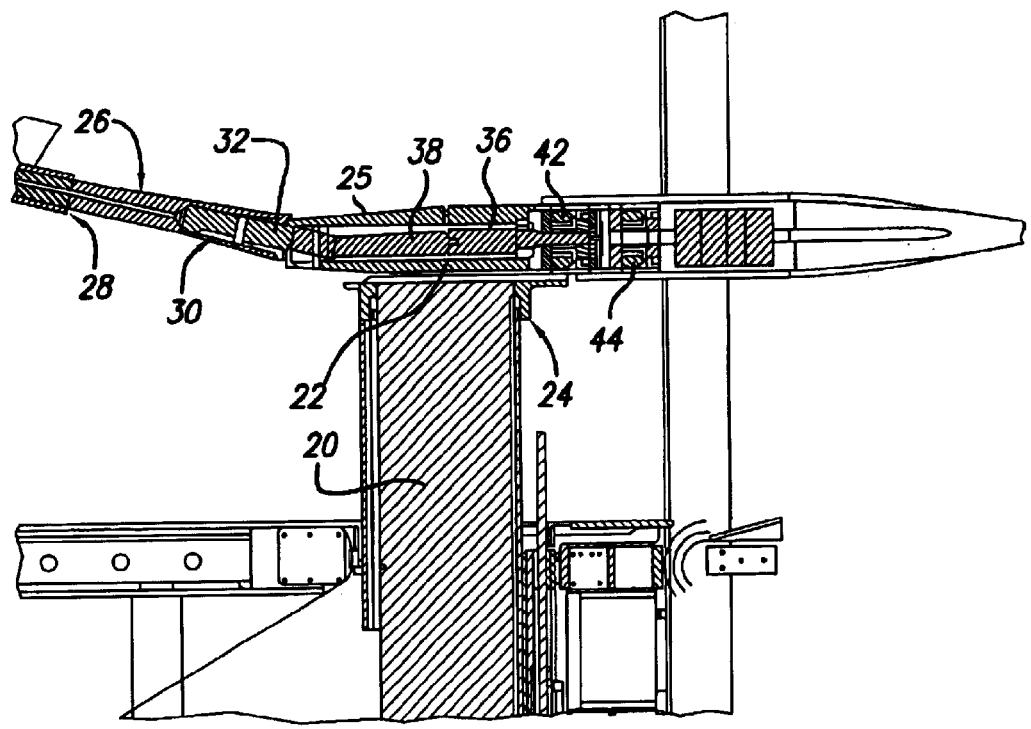
FIG. 4 is cross-sectional view of the system of FIG. 1 taken along line A—A, depicting the model in the second orientation.

With reference now to FIG. 4, the positioning system 10 further includes an aft-sting assembly 22 configured to provide roll, pitch and yaw movement of the model 14. The aft-sting assembly includes a surge mount 24 extending from a housing 25 (FIG. 5A) for attaching the assembly to the heave strut 20. The assembly includes a sting 26 to which the model is attached. Preferably, the model includes a cavity 28 in an aft portion thereof for receiving the sting. The sting includes a roll motor 30 for rotating the model through 360 degrees of roll at a rate up to about 0.75 degrees/second with a resolution of 0.01 degrees. The sting is rotatably attached to a pitch-yaw shaft 32 and is rotated relative thereto.

The pitch-yaw shaft 32 is cooperatively driven by a pitch-yaw sleeve 36 and a shaft torque tube 38 to provide the pitch-yaw shaft movement throughout a range-of-motion envelope 40 (FIG. 1) having a generally conic shape relative to a longitudinal axis (S) of the aft-sting assembly. The pitch-yaw sleeve is driven by a sleeve motor and harmonic drive 42, and the pitch-yaw shaft is driven by a shaft motor and harmonic drive 44. Preferably, the harmonic drives have a relatively high gear reduction to help facilitate precise positioning of the model. Preferably, the gear reduction ranges from 50:1 to 160:1.

Figure 5A:
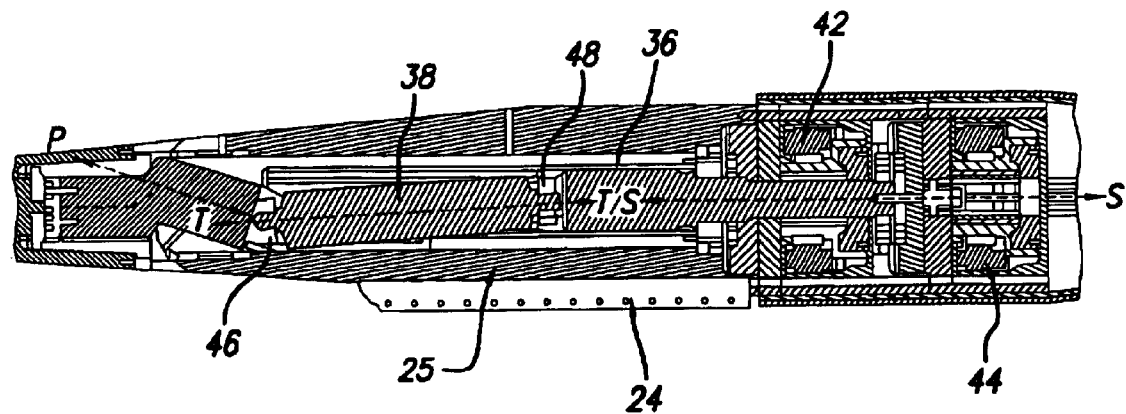
FIG. 5A is a cross-sectional view of the aft-sting assembly of the system of FIG. 1, depicting longitudinal axes of the shaft torque tube and the pitch-yaw sleeve, also depicting the crooked configuration of the pitch-yaw shaft.
Figure 5B:
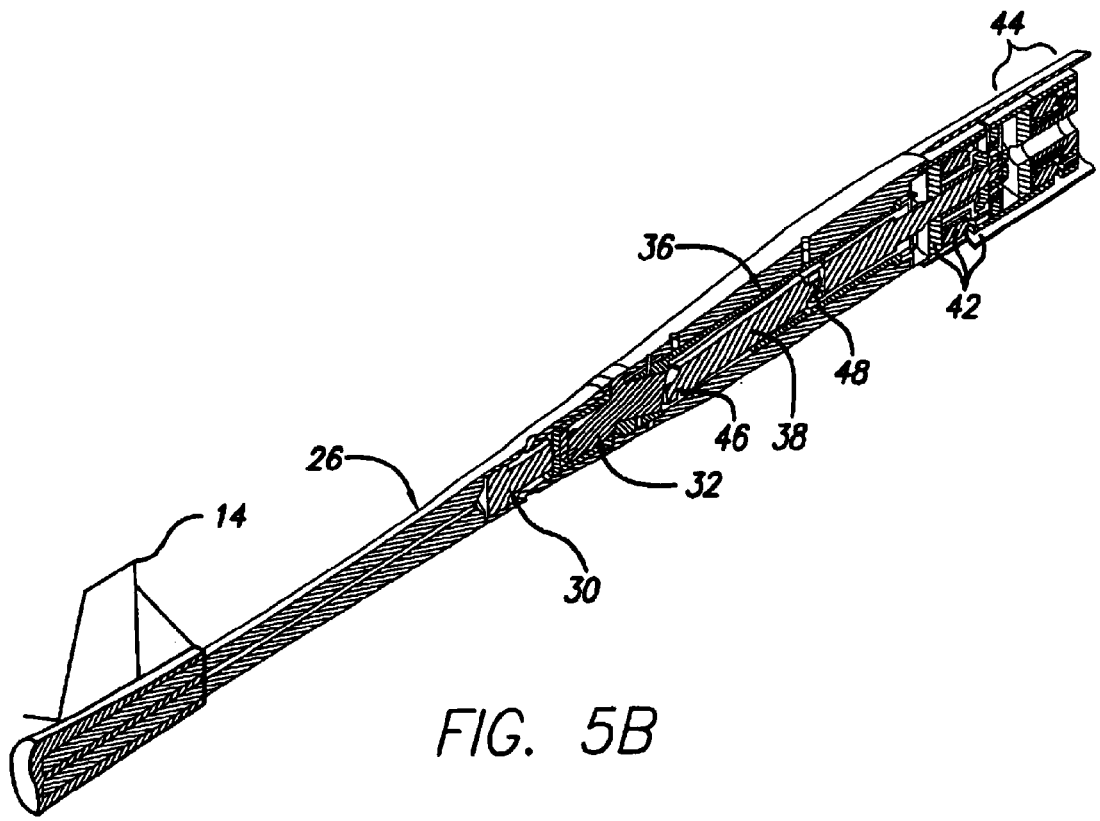
FIG. 5B is a cross-sectional view of the aft-sting assembly of the system of FIG. 1, depicting longitudinal axes of the shaft torque tube and the pitch-yaw sleeve, also depicting the crooked configuration of the pitch-yaw shaft.

With reference now to FIGS. 5A and 5B, the pitch-yaw sleeve 36 and the shaft torque tube 38 are both generally cylindrical in shape. The tube is positioned askew within the sleeve, extending axially from rotational attachments, i.e., tripod joints 46, 48 at first and second ends of the sleeve. The tube is rotatable about its longitudinal axis (T). The sleeve is rotatable about its longitudinal axis (S). The pitch-yaw shaft 32 is attached to the torque tube adjacent to attachment 46. Rotation of the torque tube causes the shaft to rotate in a 1:1 ratio. The pitch-yaw shaft is generally elongated and crooked, i.e., dog-legged, such that rotation of the torque tube causes the shaft to trace a generally wide conical pattern about axis (P). In other embodiments, the shape of the shaft can be varied to adjust its trace pattern, as needed. The sting 26 is rotatably attached to a distal end of the pitch-yaw shaft. Rotation of the pitch-yaw tube and/or the pitch-yaw sleeve provides precise pitch and yaw orientation of the model.

Figure 6A:
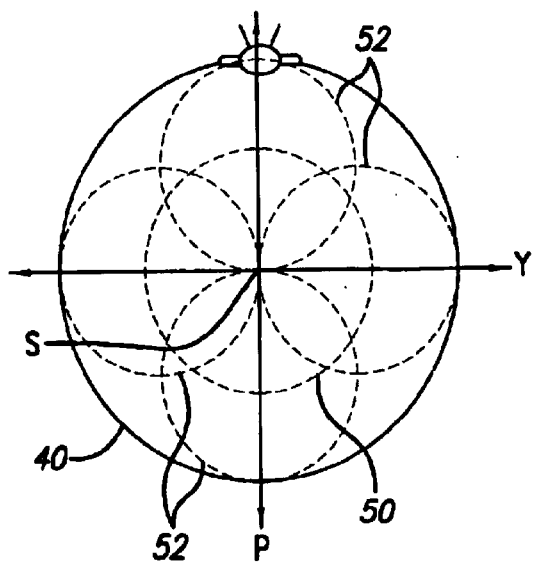
FIG. 6A is a front elevational view of a simplified diagram of the range-of-motion envelope of the positioning system of FIG. 1, depicting the model in the second orientation.

With reference now to FIG. 6A, the positioning system 10 provides a relatively large range-of-motion envelope 40 for the model 14. Offset circle 52 depicts the range of motion of the sting caused by the rotation of the pitch-yaw shaft about its axis (P) as caused by rotating the torque tube about its longitudinal axis (T). An inner circle 50 depicts movement of the center of circle 52 caused by rotating the pitch-yaw sleeve about its longitudinal axis (S). The area bounded by circle 40 depicts the total range of motion of the sting caused by the combined rotation of the torque tube and sleeve about their respective axis. The positioning system can orient the model in pitch in a range of ±30 degrees at a rate up to about 1.5 degrees/second and a resolution of 0.02 degrees. Yaw can be provided in a range of ±30 degrees at a rate up to about 1.5 degrees/second at a resolution of 0.01 degrees.

Figure 6B:
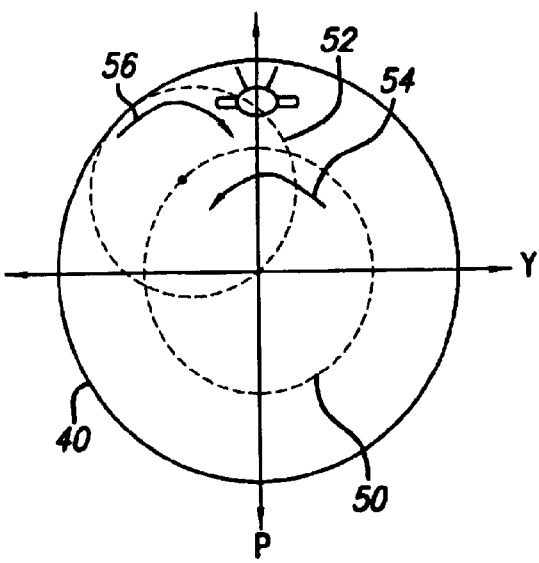
FIG. 6B is a front elevational view of a simplified diagram of the range-of-motion envelope of the positioning system of FIG. 1, depicting rotation about the S and T axes causing a decrease in pitch from the second orientation to a third orientation.
Figure 6C:
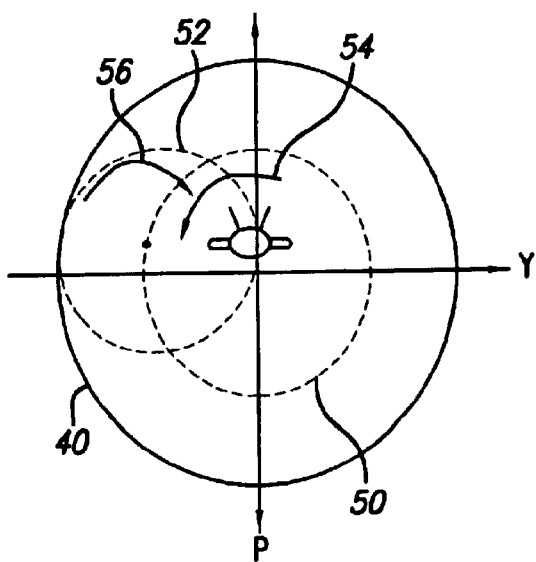
FIG. 6C is a front elevational view of a simplified diagram of the range-of-motion envelope of the positioning system of FIG. 1, depicting rotation about the S and T axes causing a decrease in pitch from the third orientation to a fourth orientation.

FIGS. 6A–6C sequentially depict a reduction in pitch of the model 14 from the second orientation to a third and forth orientation, respectively. Arrow 54 depicts a counterclockwise rotation of the sleeve, as viewed from the front. Arrow 56 depicts a clockwise rotation of the torque tube, thereby driving rotation of the pitch-yaw shaft. The combined rotation causes a prescribed reduction in pitch of the model. If zero degrees of roll are required through this movement, then the roll motor will rotate the sting relative to pitch-yaw shaft, a prescribed amount and at a prescribed rate. It will be appreciated that the model can be oriented in any pitch/yaw combination within the range-of-motion envelope.

Beneficially, the positioning system allows for tests having multiple objects. For example, it can be used in wind tunnels further having an overhead strut. More specifically, the wind tunnel can include a rolling road, i.e., moving ground plane, running at about the same speed as the airflow. In a preferred method of use, a first object is secured by the positioning system and a second object, e.g., an automobile, truck, and/or road barrier, is secured by the overhead strut. During testing, the objects are dynamically positioned relative to one another, thereby allowing data to be gathered about each of the objects while in proximity to one another in a moving ground plane environment. In another preferred method, a model is attached to the overhead strut and a sensor is attached to the positioning system, and the sensor is dynamically positioned about the model to measure aerodynamic characteristics, e.g., wake surveys, of the model.

The foregoing detailed description of the present invention is provided for the purposes of illustration and is not intended to be exhaustive or to limit the invention to the precise embodiments disclosed. Accordingly, the scope of the present invention is defined by the following claims.

We claim:

1. A positioning system orienting an object in a wind tunnel, comprising:
    a cylindrical sleeve having a longitudinal axis that defines a system axis;
    a first motor assembly mounted rearward of the sleeve, along the system axis, and configured to rotate the sleeve about the system axis;
    a torque tube mounted to the sleeve such that the longitudinal axis of the tube is askew at a prescribed angle with respect to the system axis, such that rotation of the sleeve causes the torque tube to rotate about the system axis, and such that the tube is rotatable about the tube's longitudinal axis;
    a second motor assembly mounted rearward of the sleeve, along the system axis, and configured to rotate the torque tube about the tube's longitudinal axis;
    an elongated, crooked shaft having an axis of rotation, the shaft attached to the torque tube such that rotation of the torque tube about the tube's longitudinal axis causes the shaft to rotate about the shaft's axis of rotation, the shaft having a first end spaced from the torque tube and askew at a prescribed angle with respect to the shaft's axis of rotation; and
    a sting assembly configured to receive an object, the sting assembly rotatably attached to the first end of the shaft, the sting assembly having a third motor assembly configured to rotate the sting assembly about the sting's longitudinal axis;
    wherein rotation of the sleeve, the shaft and the sting about their corresponding axes combine to provide roll, pitch and yaw positioning of the object.

2. A positioning system as defined in claim 1, wherein the torque tube extends axially from rotational attachments spaced apart from one another within the sleeve.

3. A positioning system as defined in claim 1, wherein the first and second motor assemblies each include a harmonic drive.

4. A positioning system as defined in claim 3, wherein the harmonic drives each have a gear reduction in a range from 50:1 to 160:1.

5. A positioning system as defined in claim 1, wherein the positioning system is configured to dynamically provide a change in pitch and yaw.

6. A positioning system as defined in claim 5, wherein the positioning system is configured to dynamically provide a change in pitch of the object at a rate up to about 1.5 degrees/second and a change in yaw at a rate up to about 1.5 degrees/second at a resolution of 0.01 degrees, wherein further the positioning system is configured to provide a resolution in pitch of about 0.02 degrees and a resolution in yaw of about 0.01 degrees.

7. A positioning system as defined in claim 1, further comprising a computer system configured to actuate the first, second and third motor assemblies.

8. A positioning system as defined in claim 7, wherein the computer system is configured to receive and execute a testing profile for movement of the object sequentially through a range of orientations.

9. A positioning system as defined in claim 1, further comprising:
    a housing enclosing the cylindrical sleeve;
    sway rails configured to be fixed relative to a wind tunnel;
    a carriage slidably attached to the sway rails to provide horizontal displacement; and
    a heave strut attached to the housing and slidably mounted to the carriage to provide vertical displacement.

10. A positioning system as defined in claim 9, further comprising a fourth motor assembly configured to slide the carriage along the sway rails and a fifth motor assembly configured to slide the heave strut relative to the carriage.

11. A positioning system as defined in claim 10, further comprising a computer system configured to actuate the first, second, third, fourth and fifth motor assemblies.

12. A positioning system as defined in claim 11, wherein the computer system is configured to receive and execute a testing profile for movement of the object sequentially through a range of orientations.

13. A method of positioning an object in a wind tunnel, comprising:
    mounting a first object to a positioning system, the positioning system including
        a cylindrical sleeve having a longitudinal axis that defines a system axis;
        a first motor assembly mounted rearward of the sleeve, along the system axis, and configured to rotate the sleeve about the system axis,
        a torque tube mounted to the sleeve such that the longitudinal axis of the tube is askew at a prescribed angle with respect to the system axis, such that rotation of the sleeve causes the torque tube to rotate about the system axis, and such that the tube is rotatable about the tube's longitudinal axis,
        a second motor assembly mounted rearward of the sleeve, along the system axis, and configured to rotate the torque tube about the tube's longitudinal axis,
        an elongated, crooked shaft having an axis of rotation, the shaft attached to the torque tube such that rotation of the torque tube about the tube's longitudinal axis causes the shaft to rotate about the shaft's axis of rotation, the shaft having a first end spaced from the torque tube and askew at a prescribed angle with respect to the shaft's axis of rotation, and
        a sting assembly configured to receive the first object, the sting assembly rotatably attached to the first end of the shaft, the sting assembly having a third motor configured to rotate the sting assembly about the sting's longitudinal axis; and
    providing the first object a prescribed orientation within a wind tunnel based upon rotation of the sleeve, the shaft, and the sting about their corresponding axes.

14. A method as defined in claim 13, wherein a second object is located in the wind tunnel and the first object positioned relative thereto.

15. A method as defined in claim 13, wherein the positioning system further includes a computer system configured to actuate the first, second and third motor assemblies.

16. A method as defined in claim 15, further comprising executing a testing profile provided to the computer system in which the object is dynamically provided a plurality of orientations.

17. A method as defined in claim 16, wherein a second object is located in the wind tunnel and the first object dynamically positioned relative thereto.

18. A method as defined in claim 13, wherein the positioning system further includes
a housing enclosing the cylindrical sleeve;
sway rails configured to be fixed relative to a wind tunnel;
a carriage slidably attached to the sway rails to provide horizontal displacement; and
a heave strut attached to the housing and slidably mounted to the carriage to provide vertical displacement.

19. A method as defined in claim 18, wherein the positioning system further includes a fourth motor assembly configured to slide the carriage along the sway rails and a fifth motor assembly configured to slide the heave strut relative to the carriage.

20. A method as defined in claim 19, wherein the positioning system further includes a computer system configured to actuate the first, second, third, fourth and fifth motor assemblies.

21. A method as defined in claim 20, further comprising executing a testing profile provided to the computer system in which the object is dynamically provided a plurality of orientations.

22. A method as defined in claim 21, wherein a second object is located in the wind tunnel and the first object dynamically positioned relative thereto.

* * * * *